N. LACROTTE.
PNEUMATIC SUIT FOR AVIATORS.
APPLICATION FILED NOV. 4, 1913.

1,105,569.

Patented July 28, 1914.
2 SHEETS—SHEET 1.

WITNESSES
F. O. Logan
Cornelius Hoving

INVENTOR
NAZAIRE LACROTTE
BY H. Vandeventer
ATTORNEY

N. LACROTTE.
PNEUMATIC SUIT FOR AVIATORS.
APPLICATION FILED NOV. 4, 1913.

1,105,569.

Patented July 28, 1914.
2 SHEETS—SHEET 2.

INVENTOR
NAZAIRE LACROTTE
ATTORNEY

UNITED STATES PATENT OFFICE.

NAZAIRE LACROTTE, OF PARIS, FRANCE.

PNEUMATIC SUIT FOR AVIATORS.

1,105,569.  Specification of Letters Patent.  Patented July 28, 1914.

Application filed November 4, 1913. Serial No. 799,162.

*To all whom it may concern:*

Be it known that I, NAZAIRE LACROTTE, a citizen of the Republic of France, residing at 136 Avenue Parmentier, Paris, Seine, France, have invented certain new and useful Improvements in Pneumatic Suits for Aviators, of which the following is a specification.

This invention has for its object a pneumatic combination intended for the protection of aviators, motorists and others from blows from the steering wheel or other parts in case of fall, sudden landing or the like. This combination comprises a helmet, a breastplate, thigh protectors and shin guards and each of these parts is constituted by a central core formed by square-shaped india rubber elements one face of which is flat and the other arched, the said elements being arranged in separate boxes or compartments formed by vertical and horizontal strips sewn to two inclosing pieces of canvas. The core thus constituted, is itself confined between layers of compressed and quilted cotton and elastic cotton with the interposition in the cotton of one or more cork plates and the whole is contained in an envelop, the outer face of which is covered with a sheet of leather or skin in order to prevent the envelop from being torn in contact with sharp angles.

Figure 1:
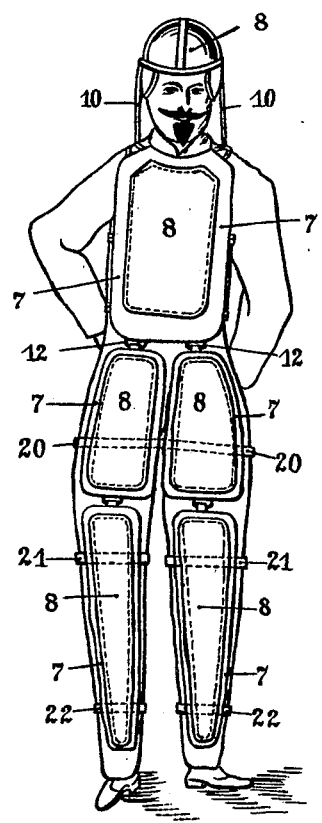
Figure 2:
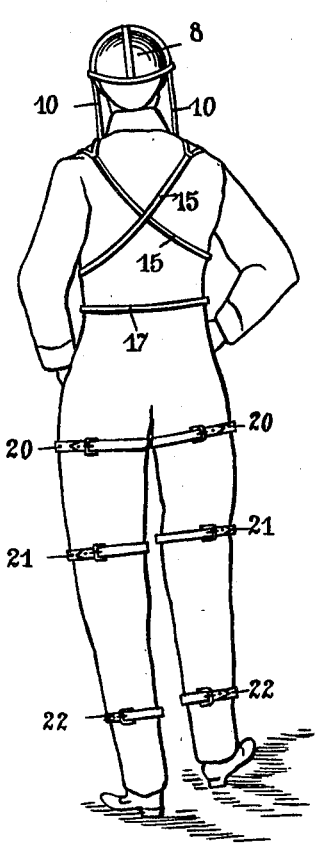
Figure 5:
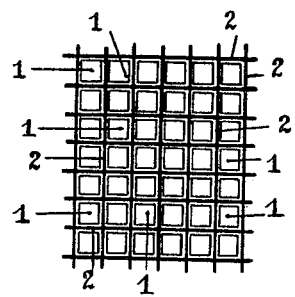
Figure 6:
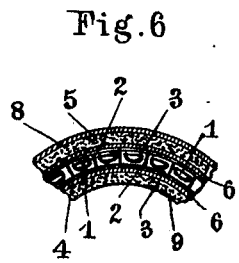
Figure 3:
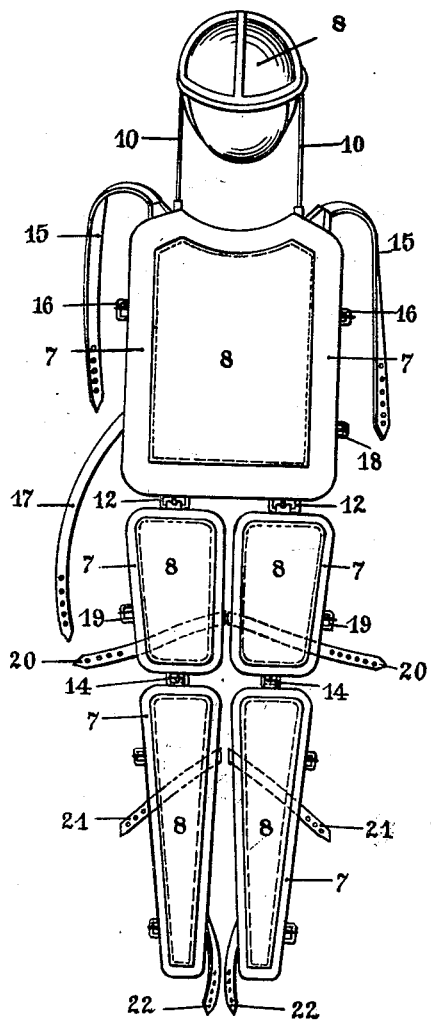
Figure 4:
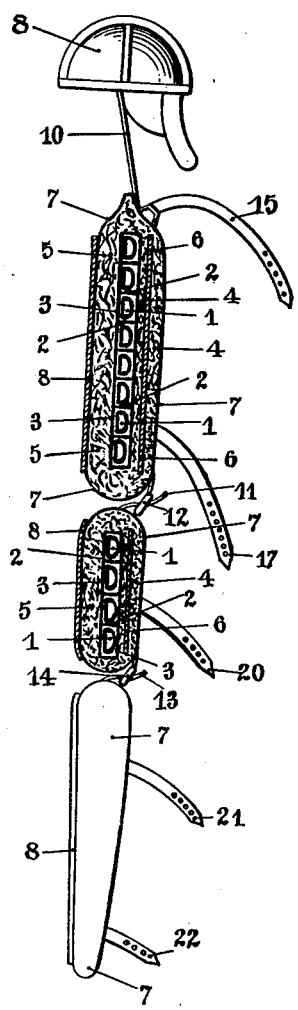

The invention is illustrated by way of example in the accompanying drawing, in which:

Figure 1 represents the combination as a whole in front elevation. Fig. 2 is a rear elevation thereof showing the method of attachment. Fig. 3 is a front elevation of the combination to a larger scale. Fig. 4 is a side elevation partly in section. Fig. 5 is a front elevation of a portion of the partitioning receiving the india rubber elements. Fig. 6 is a fragmentary section showing the structure of the helmet.

The breast plate and the thigh and shin guards comprise a central core or pneumatic cushion constituted by india rubber elements 1, which are rectangular in form in the example illustrated; these elements which are flat on one face and arched on the other, are arranged in boxes or compartments constituted by vertical and horizontal strips 2, sewn to pieces of canvas 3 which form the external partitions of the cushion proper. Instead of being rectangular in form, the india rubber elements 1 might be hexagonal, cubical or of any other, appropriate form. With elements thus arranged, practically no vacant intervals exist when they are placed in their respective compartments.

On the arched side of the india rubber elements 1, a layer of elastic cotton 4 is provided, while on the other side, a layer 5 of compressed and quilted cotton is arranged; in the middle of these layers of cotton or in the elastic cotton, only, a thin cork plate 6 is arranged. The whole is inclosed in an envelop 7 of some suitable fabric and the outside is reinforced by a sheet of pig skin or the like 8, which serves to prevent the envelop 7 from being torn in the case of violent shock against an angular object.

The helmet is composed of an external portion 8 of pig skin or the like inside which a layer 5 of compressed and quilted cotton is arranged; this layer 5 is stuck to the exterior of a cork cap 6. Beneath this cork cap 6, the india rubber elements 1 are arranged between partitions, as in the other portions of the combination. Upon the other side of the elements 1, a second cork cap 6 is arranged, so that these elements are confined between two cork caps. The interior of the cap is then furnished with a lining 9 covered with elastic cotton 4 and resting upon the head.

The compressed and quilted cotton which enters into the composition of all the parts of the combination and the cohesion of the elements of partitioned india rubber, prevent any perforation, thus preserving the wearer from fracture of the skull and the fatal effects of concussion.

The helmet is rendered integral with the breast plate by means of straps 10 provided with buckles and the breast plate is connected with the thigh guards by means of straps 11 provided with buckles 12; the shin guards are connected with the thigh guards by other straps 13 provided with buckles 14. The breast plate is held upon the aviator's person by means of braces 15 and buckles 16 and also by a belt 17 attached to the buckle 18. The thigh guards are provided with buckles 19 and belts 20 for fixing them to the thighs and the shin guards are furnished with upper straps 21 and lower straps 22 for attaching them to the legs. This pneumatic combination may be extended in such a manner that it protects every part of the body and it should be clearly understood that the elastic cotton, the compressed and quilted cotton and the leather, can be replaced by any other suitable materials. Finally, any desired modifications may be introduced without thereby affecting the principle of the invention.

Claim:

A pneumatic combination for aviators and motorists, comprising a helment, a breast plate, thigh guards and shin guards each of these parts being constituted by a central core formed by india rubber elements of rectangular form, one face of which is flat and the other arched arranged in separate boxes or compartments formed by vertical and horizontal strips sewn to two incasing pieces of canvas, the central core being confined between layers of compressed and quilted cotton and elastic cotton with the interposition of a cork plate in the cotton, the whole being contained in an envelop, the outer face of which is covered with a sheet of leather or skin for preventing the said envelop from being torn in contact with sharp angled objects.

In testimony whereof I affix my signature in presence of two witnesses.

NAZAIRE LACROTTE.

Witnesses:
MAURICE PICARD,
HANSON C. COXE.